(12) United States Patent
Birmingham

(10) Patent No.: US 8,024,584 B2
(45) Date of Patent: Sep. 20, 2011

(54) REMOTE CONNECTION SYSTEM CAPABLE OF GENERATING A WAKE-UP COMMAND AND METHOD THEREOF

(75) Inventor: Blair Birmingham, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 198 days.

(21) Appl. No.: 10/676,512

(22) Filed: Oct. 1, 2003

(65) Prior Publication Data
US 2005/0076252 A1   Apr. 7, 2005

(51) Int. Cl.
G06F 1/26 (2006.01)
G06F 1/32 (2006.01)
G06F 13/10 (2006.01)
G06F 3/01 (2006.01)

(52) U.S. Cl. ........ 713/300; 713/310; 713/320; 713/321; 713/322; 713/323; 713/324; 713/330; 713/340; 710/1; 710/8; 710/18; 455/74; 455/91

(58) Field of Classification Search ................. 713/1–2, 713/100, 150–194, 200–202, 300, 310, 320–324, 713/330, 340, 375, 400, 401, 500–503, 600–601; 710/1, 18, 8; 455/74, 91
See application file for complete search history.

(56) References Cited

U.S. PATENT DOCUMENTS

| | | | |
|---|---|---|---|
| 6,802,010 B1 * | 10/2004 | Kim et al. | 726/20 |
| 6,941,114 B1 * | 9/2005 | Kuo et al. | 455/74 |
| 6,943,667 B1 * | 9/2005 | Kammer et al. | 340/286.01 |
| 6,963,935 B1 * | 11/2005 | Young et al. | 710/29 |
| 7,005,966 B1 * | 2/2006 | Leman et al. | 340/10.4 |
| 7,058,739 B2 * | 6/2006 | Wu | 710/106 |
| 2002/0057892 A1 * | 5/2002 | Mano et al. | 386/46 |
| 2002/0062197 A1 * | 5/2002 | Parrott et al. | 702/57 |
| 2004/0198233 A1 * | 10/2004 | Pratt et al. | 455/67.11 |

FOREIGN PATENT DOCUMENTS

GB   2377516 A  *  1/2003

* cited by examiner

Primary Examiner — Thomas Lee
Assistant Examiner — Fahmida Rahman
(74) Attorney, Agent, or Firm — Vedder Price P.C.

(57) ABSTRACT

A remote connection system capable of generating a wake-up command and method thereof include a remote connector with a power supply input receiver capable of being connected to a power source and further capable of receiving a power supply for the purpose of powering the remote connector. The remote connector further includes a plurality of input ports allowing the coupling of a connector thereto and providing for the transmission of information thereacross. The remote connector further includes a wireless receiver capable of wirelessly receiving a wireless command and a transmitter capable of generating the wake-up command in response to the wireless command. The remote connector further includes a remote device capable of receiving a user input command, generating the wireless command and thereupon wirelessly transmitting the command to the wireless receiver of the remote connector.

22 Claims, 5 Drawing Sheets

REMOTE CONNECTION SYSTEM CAPABLE OF GENERATING A WAKE-UP COMMAND AND METHOD THEREOF

FIELD OF THE INVENTION

The present invention relates generally to a computer processing system and more specifically to a system for peripheral component connection.

BACKGROUND OF THE INVENTION

With the growth of computing systems, there is also a growth in the number of peripheral components, where a peripheral component is any attachable electrical and/or mechanical component, such as, but not limited to, a printer, a mouse, a joystick, a keypad or a display device. A common computing system includes, but not limited to, a desktop computer, a laptop computer, a personal digital assistant (PDA) or any other suitable system, including a processor and at least one interface for allowing interactivity with a peripheral component. Current system limitations provide for only a finite number of peripheral components to be connected to the computing system. Furthermore, there are a growing number of interfaces for allowing more devices to be connected to the computing system, such as, but not limited to, a Universal Serial Bus (USB) connector, a peripheral component interconnect (PCI) or an accelerated graphics port (AGP) bus.

As the number of connections to the computing system is limited, a solution is a remote connector having a plurality of input ports, commonly referred to as a hub. The remote connector is thereupon coupled to the computing system, occupying a single input port of the computing system, but providing multiple input ports for connecting various peripheral components. The input port may consist of a physical receptacle for engaging a peripheral connector, the input port may further consist of one or more memory modules for providing direct interface between the computing system and the peripheral device and the input port may further contain any other suitable elements, as recognized by one having ordinary skill in the art, for providing improved interconnectivity and communication between a connected peripheral component and the computing system.

One example of a remote connector is a USB hub that consists of multiple USB input ports coupled to a central internal bus. In one embodiment, the USB hub thereupon allows multiple peripheral components to be coupled to the computing system across a central USB through a USB connector coupled to a USB port in the computing system. In accordance with known USB technology, the computing system may thereupon interact with multiple peripheral components in a daisy-chain configuration.

Furthermore, the remote connectors, such as USB hubs, can be powered-using two different types of power sources. A bus-powered remote connector device is powered by a power source supplied across the bus connecting the remote connector to the computing system. Another type of remote connector is a self-powered remote connector that contains a connector for an external power source. In one embodiment, the external power source may be a standard 110 volt outlet, wherein a power supply amount to power the remote connector device is provided across a power supply input.

Another aspect of modern computing systems is a power-saving step performed by the computing system known as operating in a suspend mode. In a typical computing system, after a timed duration, or in response to a user command, the computing system may enter into a low-power consumption mode, otherwise commonly referred to as the suspend mode or the sleep mode. While within the suspend mode, the computing system requires less power and operates in accordance with known power consumption reduction technologies, such as eliminating an external display and powering down a memory component.

Concurrent with a suspend mode, computing systems also have triggers for allowing the computing system to return to normal operations, commonly referred to as waking up. In a typical computing system, a wake-up command is generated, wherein the wake-up command typically consists of a command to the central processor, or some other processor, to increase power consumption and resume normal computer operations. One example of a triggering action for a wake-up command is depressing any key on an attached keypad or keyboard. Another example of a triggering action is the movement of a peripheral device, such as a mouse.

Some computing systems execute operations that may be specific to a peripheral input device. For example; in a computing system having graphics processing, such as an All-In-Wonder device available from ATI Technologies, Inc., the system has the ability to perform operations in response to specific commands. One available option for some graphics processing systems is a remote control, such as any suitable remote device capable of transmitting a wireless command signal. One such example is the ATI RF Remote Receiver, available from ATI Technologies, Inc., which encompasses a radio frequency (RF) receiver that provides an input command to the computing system via a USB port. The wireless receiver is typically powered through the connecting port, similar to the bus-powered remote connector.

Problems arise while the computing system is operating in a suspend mode, in that the wireless receiver fails to receive enough power. Therefore, while the computing system is in a suspend mode, the wireless receiver is rendered inoperative. As there does not exist a receiver for the remote device, the remote device is thereupon unable to wake up the computing system and thereupon the computing system must be manually retrieved from suspend mode.

Another problem occurs with other types of receiving devices, as they may be implemented using an infrared transmitter, which requires a line of sight between the remote device and the wireless device. Therefore, an end user not only is required to have the receiving device visibly accessible, but also must align the remote device with the receiving device for the proper transmission of a wireless command. Furthermore, an infrared receiving device still fails to overcome the lack of power to operate the receiver when the computing system is in a suspend mode.

Since the number of input ports in a typical computing system is limited, another concern arises in using one of the limited number of input ports to couple the wireless receiver to the computing system. Therefore, it is not advantageous to connect the wireless receiver to one of the limited number of ports when the receiver itself is rendered inoperative during a suspend mode and the receiver does not have enough power to instruct the computing system to resume normal operations, exiting the suspend mode.

As such, there exists a need for a remote connector providing a plurality of input ports and allowing for the reception of a wireless command from a remote receiver when the computing system is in a suspend mode.

DETAILED DESCRIPTION OF A PREFERRED EMBODIMENT

Generally, a remote connection system includes a remote connector having a power supply input receiver capable of being connected to a power source and further capable of receiving a power supply for the purpose of powering the remote connector. The power supply input receiver may be any suitable input receiver capable of receiving an incoming power supply from the power source such as, but not limited to, a physical wire connected to an outlet plug capable of being plugged into an electrical outlet, a plurality of wires connected to a battery pack, or any other suitable power supply as recognized by one having ordinary skill in the art. The remote connector further includes a plurality of input ports, which may be a physical connector capable of receiving another connector, a plurality of memory modules capable of receiving or coupling data information, or any other suitable connector for allowing the coupling of a connector thereto and providing for the transmission of information thereacross.

The remote connector further includes a wireless receiver, which is capable of wirelessly receiving a wireless command. In one embodiment, a wireless receiver includes any suitable receiving device capable of receiving a wirelessly transmitted command, such as an antenna, a n RF receiver, an infrared receiver, or any other suitable receiver as recognized by one having ordinary skill in the art. Furthermore, a wireless command may be any type of command transmitted from a remote device wherein the command is encoded and transmitted wirelessly thereto. In one embodiment, the wireless command may be directed to a specific request, such as a wake-up request or a media display request, including commands for adjusting a media display output. The remote connector further includes a transmitter that is capable of generating a wake-up command in response to the wireless command. The transmitter may be any suitable combination of hardware, software or the combination thereof for receiving the wireless command from the receiver and, in response thereto, generating the wake-up command, which may consist of any suitable notification to be provided to a processing unit that may be currently within a suspend mode.

Also within a remote connection system, the remote connector may further be capable of receiving the wireless command from a remote device. The remote device may be any suitable device capable of receiving a user input command, such as the depression of a button, and thereupon generating a command and thus wirelessly transmitting the command to the wireless receiver of the remote connector.

Figure 1:
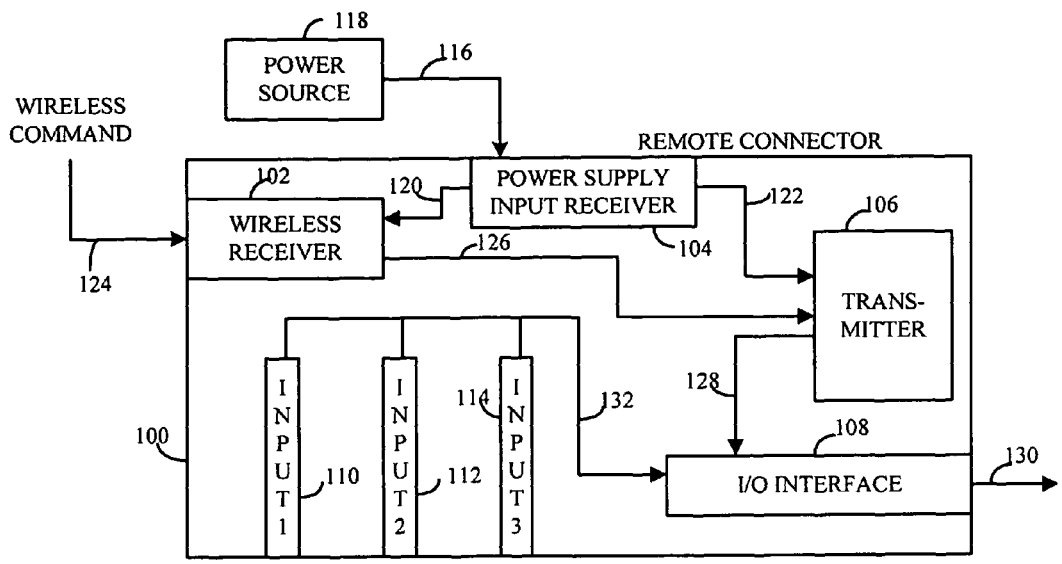
FIG. 1 illustrates a remote connector in accordance with one embodiment of the present invention.

More specifically, FIG. 1 illustrates a remote connector 100 having a wireless receiver 102, a power supply input receiver 104, a transmitter 106, an input/output (I/O) interface 108 and a plurality of input ports 110, 112 and 114. In accordance with one embodiment of the present invention, the power supply input receiver 104 receives a power supply 116 from a power source 118. The power supply 116 is thereupon provided to the wireless receiver 102 illustrated as 120 and to the transmitter 106 illustrated as 122. The wireless receiver 102 is capable of receiving a wireless command 124 and thereupon providing the wireless command 124 to the transmitter 106 via an internal bus 126.

The transmitter 106 may thereupon generate a wake-up command 128, which is provided to the I/O interface 108. The I/O interface 108 is further coupled to an output bus 130 such that the I/O interface 108 may provide the wake-up command 128 to a processing unit (not illustrated).

In addition to providing for the reception of wireless commands 124, the remote connector 100 further operates as a hub for allowing for the remote connection of peripheral devices (not illustrated). The peripheral devices may be coupled to the remote connector 100 via the input ports 110, 112 and/or 114, wherein the input ports 110, 112 and 114 are coupled to the I/O interface 108 via an internal bus 132. In one embodiment, the input ports 110, 112 and 114 are universal serial bus (USB) ports, which provide for the interface with a processing unit (not illustrated) in a daisy-chain fashion. As recognized by one having ordinary skill in the art, the input ports 110, 112 and 114 and the output bus may be any other suitable interface as recognized by one having ordinary skill in the art.

Figure 2:
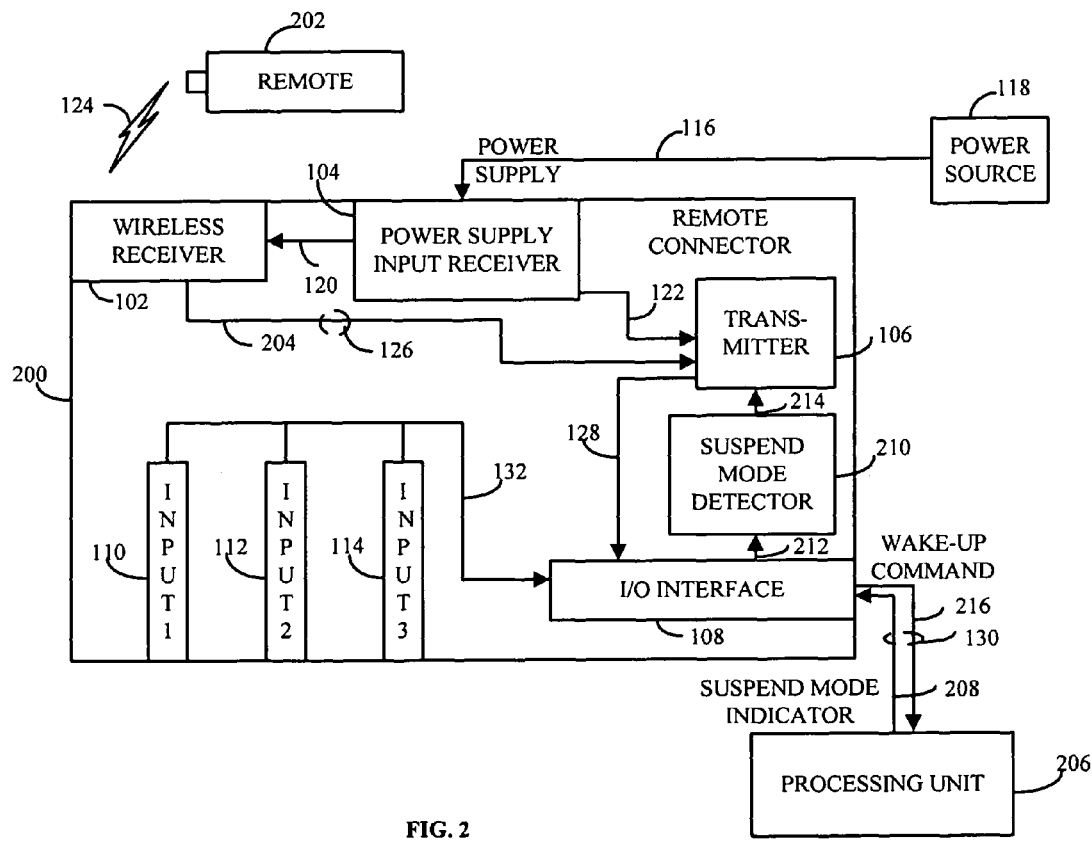
FIG. 2 illustrates a remote connection system in accordance with one embodiment of the present invention.

FIG. 2 illustrates a remote connection system in accordance with one embodiment of the present invention. The remote connection system includes a remote connector 200, a remote device 202 that is capable of generating the wireless command 124 that is receivable by the wireless receiver 102. Similar to the remote connector 100 of FIG. 1, the remote connector 200 of FIG. 2 includes the power supply input receiver 104, the transmitter 106, the input ports 110, 112 and 114 and the I/O interface 108. Furthermore, the power supply input receiver 104 receives the power supply 116 from the power source 118 and thereupon provides power to the wireless receiver 102 illustrated as 120 into the transmitter 106 illustrated as 122. Furthermore, the wireless receiver 102 also provides a received wireless command 204 to the transmitter 106 via bus 126 and the transmitter provides a command to be transmitted to the I/O interface 108 via bus 128.

The system of FIG. 2 further includes the remote connector 200 coupled to a processing unit 206. As recognized by one having ordinary skill in the art, the processing unit 206 may be any suitable computer processing system, including, but not limited to, a stand-alone processor, a standard computing system, a component within a computing system for processing I/O interfaces with a remote connector 200, or any other suitable device. In one embodiment, the processing unit 206 generates a suspend mode indicator 208, which is provided to the I/O interface 108 via the output bus 130. The suspend mode indicator 208 may be an actual signal indicating that the processing unit 206 or a processor associated with the processing unit 206 is entering into a suspend mode. Furthermore, the suspend mode indicator 208 may be a power voltage indication based on a decrease in power being transmitted across the bus 130. Regardless thereof, the I/O interface 108 thereupon receives the indicator 208 and provides this indication to a suspend mode detector 210 via connection 212. In one embodiment, the suspend mode detector 210 may be a power monitoring system that detects when there is a drop in bus power across the output bus 130, a monitoring system that notes the presence of a suspend detector, such as a flag or other indicator of a power charge or may be any other suitable combination for detecting when the processing unit 206 is entered into a suspend mode. The suspend mode detector 210 is further coupled to the transmitter 106 via connection 214 for providing a notification to the transmitter 106 that the processing unit 206 is operating in a suspend mode.

In the same embodiment, when the remote 202 provides the wireless command 124 and the wireless receiver 102 forwards the wireless command 204 to the transmitter 106 via bus 126, the transmitter 106 thereupon automatically generates the wake-up command 128 to be provided to the I/O interface via connection 128. A transmittable wake-up command 216 may thereupon be provided to the processing unit 206 across the output bus 130 for waking up, or having the processing unit 206 exit the suspend mode operation, wherein the wake-up command 128 and the transmittable wake-up command 216 may contain encoding differences associated with the transmission across the output bus 130.

Furthermore, within the same embodiment, when the transmitter 106 does not have an indication that the processing unit 206 is within a suspend mode, the transmitter 106 may thereupon provide the I/O interface 108 all of the wireless commands 124 provided from the remote 202 to the wireless receiver 102 and thereupon provided as received wireless commands 204. In one embodiment, as discussed below with respect to FIG. 3, the remote 202 may contain multiple different media display commands that are to be provided to the processing unit 206, as the remote connector 200 thereupon provides a conduit for not only receiving the wireless command 124 but also transmitting the wireless commands 124 to the processing unit 206 via the output bus 130. Therefore, the remote connector 200, as well as the remote connector 100 of FIG. 1, improves over prior art solutions by providing for the combination of multiple input ports 110, 112 and 114 as well as a wireless receiver 102 capable of receiving wireless commands 124 from the remote 202. Furthermore, the output bus 130 may occupy one of the limited number of input ports within a processing unit 206 and thereupon provide the added benefit of additional input ports via the remote connector 200.

Figure 3:
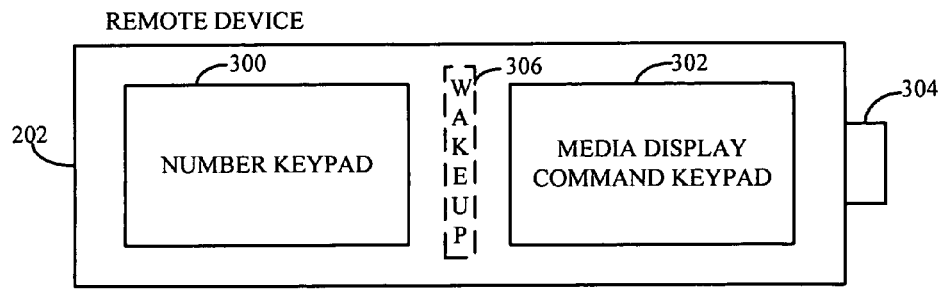
FIG. 3 illustrates a remote device in accordance with one embodiment of the present invention.

FIG. 3 illustrates the remote device 202 in accordance with one embodiment of the present invention. The remote device 202 includes a numbered keypad 300, a media display command keypad 302 and a transmitter 304. In one embodiment, the remote device 202 may further contain a wake-up button 306 for the sole purpose of providing a wake-up command. The numbered keypad 300 is a standard number keypad having numbered buttons zero through nine and may further contain other buttons, including, but not limited to, alphabetic or character buttons. The media display command keypad 302 may contain a plurality of keypads in order to provide for different media display commands. For example, the media display command keypad 302 may contain a button (not shown), having a triangle to represent a play button. The remote device 202 may operate in accordance with known remote device technology for receiving an input and thereupon encoding the corresponding command. Furthermore, as recognized by one having ordinary skill in the art, the media display command keypad 302 may contain buttons allowing for other media display commands, such as a pause command to pause a current display, a fast forward command to advance a current output display, a rewind command for rewinding a display, a record command to initiate a sequence to store a current display to a memory, a volume adjustment command for increasing or decreasing the corresponding volume with respect to an output, a change display command indicating a change of a corresponding output display device such as choosing between a first media player such as a DVD player and a second media device such as a cable feed, and any other suitable media display commands as recognized by one having ordinary skill in the art.

Figure 4:
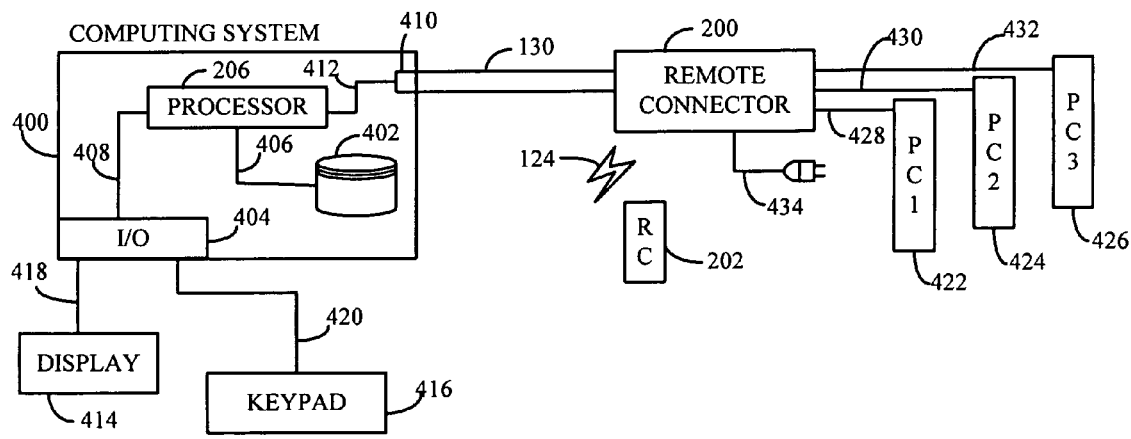
FIG. 4 illustrates the remote connection system in accordance with another embodiment of the present invention.

FIG. 4 illustrates the remote connector 200 coupled to a computing system 400 via the output bus 130. The computing system 400 includes the processing unit 206 coupled to a memory 402 and an I/O interface 404 via buses 406 and 408, respectively. As recognized by one having ordinary skill in the art, many elements have been omitted from the computing system 400 for clarity purposes only. The computing system 400 also includes an input port 410 capable of receiving the output bus 130, and coupling the input port 410 to the processing unit 206 is a system bus 412. The computing system 400 is further coupled to a 414 and a keypad 416 through the I/O interface 404, wherein the display 414 receives display information 418 from the processing unit 206 and the keypad provides keystroke information 420 to the processing unit 206.

Further illustrated in FIG. 4, the remote connector 200 receives the wireless command 124 from the remote device 202, and the remote connector 200 further couples a plurality of peripheral components 422, 424 and 426. The peripheral components 422, 424 and 426 may be any suitable peripheral component such as, but not limited to, a media input device such as a camera, an audio input device such as a microphone, a streaming media input device such as a DVD player, or any other suitable peripheral component as recognized by one having ordinary skill in the art. The peripheral components are further coupled to the remote connector 200 via connections, such as cables, 428, 430 and 432, respectively. In one embodiment, the cables 428, 430 and 432 are USB cables such that the remote connector provides three USB ports (the ports not specifically illustrated in FIG. 4).

The remote connector 200 further includes an outlet plug 434, which is capable of being plugged into an electrical outlet (not illustrated) for providing the previously discussed power source. As recognized by one having the ordinary skill in the art, in an alternative embodiment, the remote connector 200 may further contain a battery pack or other power-generating source beyond the electrical outlet connector 434. Thereupon, FIG. 4 illustrates the remote connector 200 having the ability to act both as a wireless receiver from the remote device 202 as well as a hub for allowing the connection of multiple peripheral components 422, 424 and 426, which may thereupon be coupled to the computing system 400 across the output bus 130.

Figure 5:
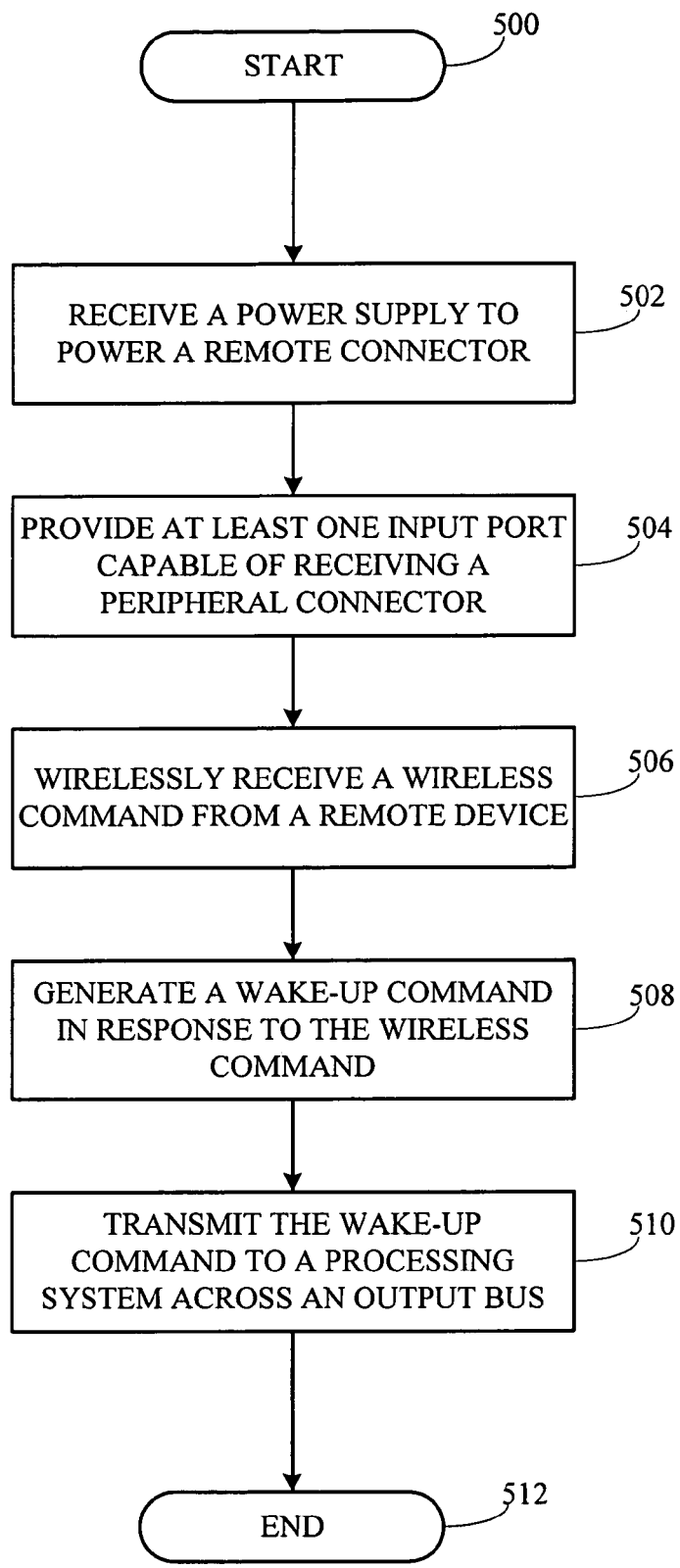
FIG. 5 illustrates a flow chart of a method for remote connecting in accordance with one embodiment of the present invention.

FIG. 5 illustrates a flow chart representing the steps of a method for remote connecting. The method begins, step 500, by receiving a power supply to power the remote connector, step 502. As discussed above, the power supply may be provided from power source 118 to a power supply input receiver 104. The next step is providing at least one input port capable of receiving a peripheral connector, step 504. As discussed above with respect to FIG. 1, the input ports 110, 112 and 114 allow for the coupling of peripheral components therein. The next step is wirelessly receiving a wireless command from a remote device, step 506. In one embodiment, the wireless command 124 may be received by the wireless receiver 102 from the remote device 202.

Thereupon, a wake-up command is generated in response to the wireless command, step 508. The next step, step 510, is transmitting the wake-up command 128 across an output bus. In one embodiment, the output bus 130 provides for the wake-up command 128 to be provided to the I/O interface 108 from the transmitter 106 across the bus 128. Thereupon, the method is complete, step 512, and thereby, a remote connector is provided, including multiple input ports to act as a hub for peripheral components through allowing for the insertion of peripheral connectors in the input ports and also a wireless receiver for receiving wireless transmissions from a remote device.

Figure 6:
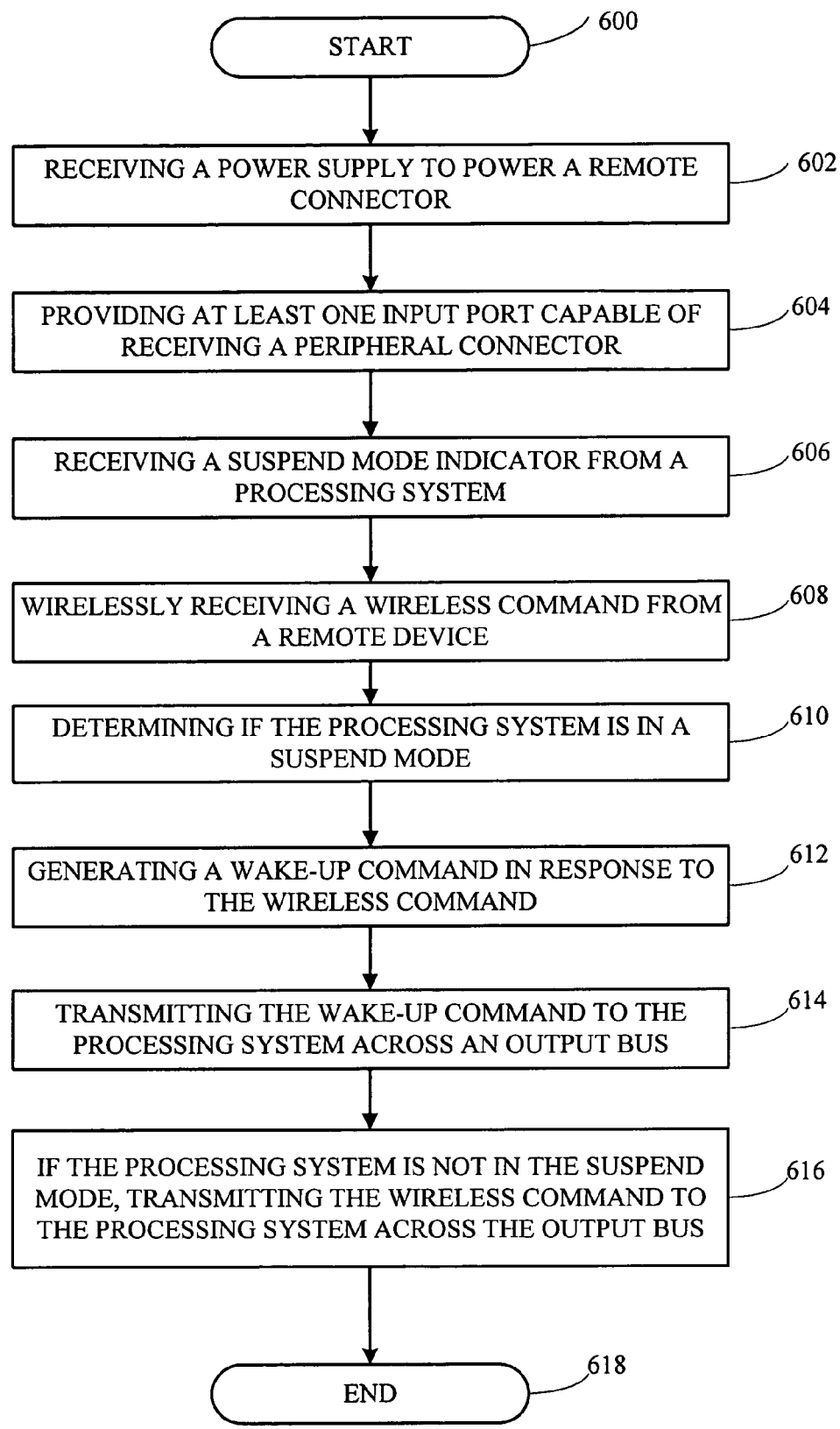
FIG. 6 illustrates another method for remote connecting in accordance with one embodiment of the present invention.

FIG. 6 illustrates another embodiment of a method for remote connecting in accordance with one embodiment to the present invention. The method begins, step 600, by receiving a power supply to power a remote connector, step 602. Step 602 is similar to step 502 of the method of FIG. 5. The next step, 604, similarly to step 504, FIG. 5, is providing at least one input port capable of receiving a peripheral connector wherein the peripheral connector couples a peripheral component thereto.

The next step is receiving a suspend mode indicator from a processing system, step 606. As discussed above, a suspend mode indicator may be any kind of indication or transmission that indicates the processor is not operating in normal mode but rather operating in a suspend mode. The next step is wirelessly receiving a wireless command from a remote device, step 608, similar to step 506 of FIG. 5.

The next step, step 610, is determining if the processing system is in a suspend mode. In one embodiment, the transmitter 106 may contain a toggle switch indicating whether or not it has received a suspend mode indicator or any other type of indication from a suspend mode detector 210. The next step is generating a wake-up request in response to a wireless command, step 612, in the event that the transmitter 106 has determined that the processing unit 206 is in the suspend mode or that the wake-up request is warranted. Thereupon, the next step is transmitting the wake-up request to the processing system across an output bus, step 614, similarly to step 510 of FIG. 5.

If the processing system is not in the suspend mode, the next step is transmitting the wireless command to the processing system across the output bus 616. In the event that the processing system is not in a suspend mode, the transmitter 106 allows the wireless command 124 to be provided a standard, normal media display command, such as discussed above, including a play, stop, rewind, record or any other media display command. Thereupon, the method is complete, step 618.

Figure 7:
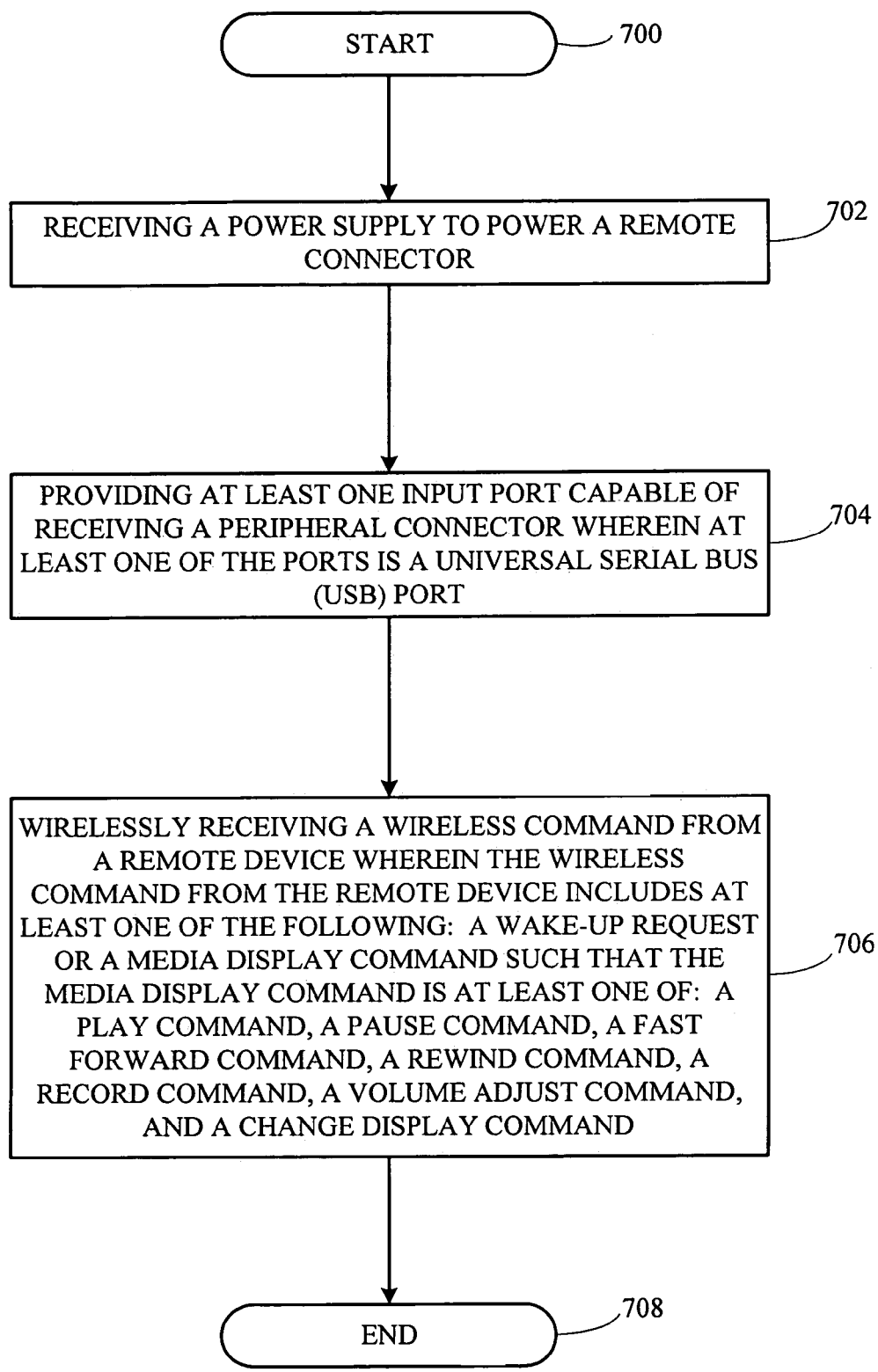
FIG. 7 illustrates another method for remote connecting in accordance with one embodiment of the present invention.

FIG. 7 illustrates another embodiment of a method for remote connecting in accordance with one embodiment to the present invention. The method begins, at step 700, by receiving a power supply to a power remote connector, step 702, similarly to step 502 of FIG. 5. Thereupon, at least one input port capable of receiving a peripheral component is provided in step 704, wherein the input ports are USB ports. The next step is wirelessly receiving a wireless command from a remote device, step 706. The wireless command from the remote device may include but is not limited to, at least one of the following: a wake-up request or a media display command wherein the media display command may be a play command, a pause command, a fast forward command, a rewind command, a record command, a volume adjust command, a change display command or any other suitable media display command as recognized by one having ordinary skill in the art. The method further includes providing at least one USB port for allowing the connection of multiple peripheral components having a USB interface, as in accordance with step 704. Thereupon, the method is complete, step 708.

The present invention improves over the prior art by providing the remote connector 100 or 200, otherwise referred to as a hub, capable of allowing the coupling of multiple peripheral components 422, 424 and 426 to the processing unit 206. The remote connector further provides for the reception of wireless commands 124 provided from the remote device 202. Moreover, the remote connector utilizes an independent power supply 116 and is not powered by the output bus 130. Thereupon, when the processing unit 206 is in a suspend mode, the remote connector, such as 100 or 200, maintains an operation level to properly and effectively receive the wireless command 124, which may then be used to wake up the processing unit. As stated above, prior art solutions failed to provide enough external input slots, failed to operate when the processing system is in a suspend mode and failed to allow an end user to awaken the processing system from the suspend mode using the remote device 202, which the present invention overcomes.

It should be understood that there exist implementations of other variations and modifications of the invention and its various aspects as may be readily apparent to those of ordinary skill in the art and that the invention is not limited by the specific embodiments described herein. For example, the processing unit 206 may be awakened by other peripheral components coupled to the input ports 110, 112 and 114, wherein the remote connector 200 allows for the awakening of the processing unit 206 through the remote 202 and through attached peripheral components. There are therefore contemplated, and covered by the present invention, any and all modifications, variations or equivalents that fall within the scope of the basic underlying principles disclosed and claimed herein.

What is claimed is:

1. A remote connector comprising:
   a power supply input receiver operably coupleable to a non-bus power source and being capable of receiving a power supply for powering the remote connector;
   a plurality of ports, each of the plurality of ports capable of physically receiving a peripheral component for communication with a remote processing unit, wherein each peripheral component is at least one of an input device, or an output device or an input/output device;
   a wireless receiver capable of wirelessly receiving a wireless command from a remote device; and
   a transmitter capable of generating a wake-up command for the remote processing unit in response to the wireless command and capable of providing the wake-up command through an input/output interface to the remote processing unit operably coupleable to the remote connector.

2. The remote connector of claim 1 further comprising:
   a bus capable of being operably coupled to the processing unit, such that the wake-up command may be provided to the processing unit through the bus.

3. The remote connector of claim 1 wherein the wireless receiver further includes an antenna, such that the receiver receives the wireless command through the antenna.

4. The remote connector of claim 3 wherein the wireless command is transmitted using a radio frequency transmission and the wireless receiver is a radio frequency receiver.

5. The remote connector of claim 1 wherein the plurality of ports are universal serial bus (USB) ports.

6. The remote connector of claim 1 wherein the wireless command from the remote device includes at least one of the following: a wake-up request or a media display command.

7. A remote connection system comprising:
   a remote connector including:
      a power supply input receiver operably coupled to a first non-bus power source and being capable of receiving a first power supply for powering the remote connector;
      a plurality of ports, each capable of physically receiving a peripheral component for communication with a remote processing unit operably coupled to a second power source and being capable of receiving a second power supply for powering the remote processing unit, wherein each peripheral component is at least one of an input device, or an output device or an input/output device;

a wireless receiver that receives a wireless command;

a transmitter operative to generate a wake-up command for the remote processing unit in response to the wireless command; and an input/output port operably coupled to the processing unit, such that the wake-up command may be provided to the remote processing unit; and a remote device capable of generating the wireless command and providing the wireless command to the remote connector.

8. The remote connection system of claim 7 wherein the plurality of ports are universal serial bus (USB) ports.

9. The remote connection system of claim 7 wherein the wireless command is transmitted using a radio frequency transmission and the wireless receiver is a radio frequency receiver.

10. The remote connection system of claim 7 such that the wireless command from the remote device includes at least one of the following: a wake-up request or a media display command, wherein the media display command is at least one of: a play command, a pause command, a fast forward command, a rewind command, a record command, a volume adjust command and a change display command.

11. A method for remote connecting comprising:

receiving a first non-bus power supply to power a remote connector;

providing, by the remote connector, a plurality of ports, each capable of physically receiving a peripheral component for communication with a remote processing system having a second power supply to power the remote processing system, wherein each peripheral component is at least one of an input device, or an output device or an input/output device;

wirelessly receiving, by the remote connector, a wireless command from a remote device;

generating a wake-up command, by the remote connector for the remote processing system, in response to the wireless command; and transmitting the wake-up command to the remote processing system coupled to the remote connector across a bus.

12. The method of claim 11 wherein the wireless command from the remote device includes at least one of the following: a wake-up request or a media display command, such that the media display command is at least one of: a play command, a pause command, a fast forward command, a rewind command, a record command, a volume adjust command and a change display command.

13. The method of claim 11 wherein the step of providing the plurality of ports further comprises:

providing a plurality of universal serial bus (USB) ports.

14. The method of claim 11 wherein the bus is a universal serial bus (USB).

15. A remote connector comprising:

a power supply input receiver operably coupleable to a first power source and being capable of receiving a first power supply for powering the remote connector;

a plurality of ports, each capable of physically receiving a peripheral component for communication with a second processing unit that is operably coupleable to a second power source and is capable of receiving a second power supply for powering the remote processing unit, wherein each peripheral component is at least one of an input device, or an output device or an input/output device;

a radio frequency receiver capable of wirelessly receiving a wireless command from a remote device, wherein the wireless command is transmitted using a radio frequency transmission, and wherein the wireless command includes at least one of the following: a wake-up request or a media display command;

a transmitter capable of generating a wake-up command in response to the wireless command;

a bus capable of operably coupling the remote connector to the processing unit, such that the wake-up command may be provided to the processing unit through the bus; and a suspend mode detector capable of receiving a suspend mode indicator from the processing unit such that the transmitter can determine if the wake-up command needs to be generated.

16. The remote connector of claim 15 wherein the plurality of ports and an external port are universal serial bus (USB) ports.

17. The remote connector of claim 15 wherein when the wireless command includes the media display command, the media display command is at least one of: a play command, a pause command, a fast forward command, a rewind command, a record command, a volume adjust command and a change display command.

18. A remote connector comprising:

a power supply input receiver operably coupleable to a non-bus power source and being capable of receiving a power supply for powering the remote connector, wherein the remote connector is operably remote with respect to a computing system;

a plurality of ports, each of the plurality of ports capable of receiving a peripheral component for communication with the computing system;

a wireless receiver capable of wirelessly receiving a wireless command from a remote device; and a transmitter capable of generating a wake-up command for a remote processing unit in response to the wireless command and capable of providing the wake-up command through an input/output interface to the remote processing unit operably coupleable to the remote connector.

19. A remote connector comprising:

a power supply input receiver operably coupleable to a power source and being capable of receiving a power supply for powering the remote connector;

a plurality of ports, each of the plurality of ports capable of physically receiving a peripheral component for communication with a remote processing unit, wherein each peripheral component is one of an input device, an output device and an input/output device;

a wireless receiver capable of wirelessly receiving a wireless command from a remote device;

a transmitter capable of generating a wake-up command in response to the wireless command and capable of providing the wake-up command through an input/output interface to the processing unit operably coupleable to the remote connector; and wherein the wireless command includes a media display command, and wherein the media display command is at least one of: a play command, a pause command, a fast forward command, a rewind command, a record command, a volume adjust command and a change display command.

20. A remote connector comprising:
a power supply input receiver operably coupleable to a power source and being capable of receiving a power supply for powering the remote connector;
a plurality of ports, each of the plurality of ports capable of physically receiving a peripheral component for communication with a remote processing unit, wherein each peripheral component is at least one of an input device, or an output device or an input/output device;
a wireless receiver capable of wirelessly receiving a wireless command from a remote device;
a transmitter capable of generating a wake-up command in response to the wireless command and capable of providing the wake-up command through an input/output interface to the processing unit operably coupleable to the remote connector;
a bus capable of being operably coupled to the processing unit, such that the wake-up command may be provided to the processing unit through the bus; and
a suspend mode detector capable of receiving a suspend mode indicator from the processing unit such that the transmitter can determine if the wake-up command needs to be generated.

21. A remote connection system comprising:
a remote connector including:
   a power supply input receiver operably coupled to a first power source and being capable of receiving a first power supply for powering the remote connector;
   a plurality of ports, each capable of physically receiving a peripheral component for communication with a remote processing unit operably coupled to a second power source and being capable of receiving a second power supply for powering the remote processing unit, wherein each peripheral component is at least one of an input device, or an output device or an input/output device;
   a wireless receiver that receives a wireless command;
   a transmitter operative to generate a wake-up command in response to the wireless command;
   an input/output port operably coupled to the processing unit, such that the wake-up command may be provided to the processing unit;
the remote connection system also comprising:
   a remote device capable of generating the wireless command and providing the wireless command to the remote connector;
   a bus coupled to the input/output port, the bus capable of being operably coupled to the processing unit, such that the wake-up command may be provided to the processing unit through the bus; and
   a suspend mode detector capable of receiving a suspend mode indicator from the processing unit such that the transmitter can determine if the wake-up command needs to be generated.

22. A method for remote connecting comprising:
receiving a first power supply to power a remote connector;
providing, by the remote connector, a plurality of ports, each capable of physically receiving a peripheral component for communication with a remote processing system having a second power supply to power the remote processing system, wherein each peripheral component is at least one of an input device, or an output device or an input/output device;
wirelessly receiving, by the remote connector, a wireless command from a remote device;
generating a wake-up command, by the remote connector, in response to the wireless command;
transmitting the wake-up command to the processing system coupled to the remote connector across a bus;
prior to receiving the wireless command, receiving a suspend mode indicator from the processing system;
prior to generating the wake-up command, determining if the processing system is in a suspend mode; and
if the processing system is not in the suspend mode, transmitting the wireless command to the processing system across the bus.

* * * * *